US010297262B2

(12) United States Patent
Mani et al.

(10) Patent No.: US 10,297,262 B2
(45) Date of Patent: *May 21, 2019

(54) COMFORT NOISE GENERATION

(71) Applicant: Imagination Technologies Limited, Kings Langley (GB)

(72) Inventors: Senthil Kumar Mani, Hyderabad (IN); Srinivas Akella, Hyderabad (IN)

(73) Assignee: Imagination Technologies Limited, Kings Langley (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/645,296

(22) Filed: Jul. 10, 2017

(65) Prior Publication Data

US 2017/0309282 A1 Oct. 26, 2017

Related U.S. Application Data

(63) Continuation of application No. 14/934,658, filed on Nov. 6, 2015, now Pat. No. 9,734,834.

(30) Foreign Application Priority Data

Nov. 6, 2014 (GB) .................................. 1419784.2

(51) Int. Cl.
*H04M 3/00* (2006.01)
*G10L 19/06* (2013.01)
*G10L 19/012* (2013.01)

(52) U.S. Cl.
CPC ............ *G10L 19/012* (2013.01); *G10L 19/06* (2013.01); *H04M 3/002* (2013.01)

(58) Field of Classification Search
None
See application file for complete search history.

(56) References Cited

U.S. PATENT DOCUMENTS 4,031,338 A 6/1977 Campanella et al.
4,577,071 A 3/1986 Johnston et al.
(Continued)

FOREIGN PATENT DOCUMENTS

| CA | 2275832 A1 | 12/2000 |
| EP | 1720249 A1 | 11/2006 |
| WO | 99/35813 A1 | 7/1999 |

OTHER PUBLICATIONS

G.711 : A comfort noise payload definition for ITU-T G.711 use in packet-based multimedia communication systems; ITU-T Recommendation—Appendix II; Feb. 28, 2000.
(Continued)

*Primary Examiner* — Fariba Sirjani
(74) *Attorney, Agent, or Firm* — Vorys, Sater, Seymour and Pease LLP; Vincent M DeLuca

(57) ABSTRACT

A system for generating comfort noise for a stream of frames carrying an audio signal includes frame characterizing logic configured to generate a set of filter parameters characterising the frequency content of a frame; an analysis filter adapted using the filter parameters and configured to filter the frame so as to generate residual samples; an analysis controller configured to cause the residual samples to be stored in a store responsive to receiving an indication that the frame does not comprise speech; and a synthesis controller operable to select stored residual samples from the store and cause a synthesis filter, inverse to the analysis filter and adapted using filter parameters generated by the frame characterizing logic for one or more frames not comprising speech, to filter the selected residual samples so as to generate a frame of comfort noise.

20 Claims, 5 Drawing Sheets

(56) References Cited

U.S. PATENT DOCUMENTS

| | | | |
|---|---|---|---|
| 4,679,230 | A | 7/1987 | Lassaux et al. |
| 5,448,680 | A | 9/1995 | Kang et al. |
| 5,761,636 | A * | 6/1998 | Bolton .................. H04B 1/665 |
| | | | 704/229 |
| 5,812,965 | A | 9/1998 | Massaloux |
| 5,960,389 | A * | 9/1999 | Jarvinen ............... G10L 19/012 |
| | | | 704/215 |
| 6,055,497 | A | 4/2000 | Hallkvist et al. |
| 6,108,623 | A | 8/2000 | Morel |
| 6,160,886 | A | 12/2000 | Romesburg et al. |
| 6,163,608 | A * | 12/2000 | Romesburg ........... H04M 9/082 |
| | | | 379/406.01 |
| 6,597,787 | B1 * | 7/2003 | Lindgren ................. H04B 3/21 |
| | | | 379/406.01 |
| 6,711,537 | B1 | 3/2004 | Beaucoup |
| 6,766,020 | B1 | 7/2004 | Tian et al. |
| 6,782,361 | B1 * | 8/2004 | El-Maleh ............. G10L 19/012 |
| | | | 704/223 |
| 6,842,734 | B2 | 1/2005 | Yamada et al. |
| 7,610,197 | B2 | 10/2009 | Cruz-Zeno et al. |
| 7,831,035 | B2 | 11/2010 | Stokes et al. |
| 9,734,834 | B2 * | 8/2017 | Mani ..................... G10L 19/012 |
| 2006/0171373 | A1 | 8/2006 | Li |
| 2008/0002620 | A1 | 1/2008 | Anderton et al. |
| 2008/0046233 | A1 | 2/2008 | Chen et al. |
| 2008/0306736 | A1 * | 12/2008 | Sanyal ................ G10L 19/0019 |
| | | | 704/233 |
| 2011/0228946 | A1 | 9/2011 | Chen et al. |
| 2014/0316774 | A1 | 10/2014 | Wang |
| 2015/0235648 | A1 * | 8/2015 | Jansson Toftgard ........................ |
| | | | G10L 19/012 |
| | | | 704/226 |
| 2017/0018277 | A1 * | 1/2017 | Wang ..................... G10L 19/06 |

OTHER PUBLICATIONS

G.711 "Pulse code modulation" Recommendation /Appendix II (Feb. 2000), pp. 1-10.

Hosom "Estimating Speech Parameters" Oregon Health & Science University, OGI School of Science & Engineering, 2006.

Sakhnov et al. "Method for Comfort Noise Generation and Voice Activity Detection for use in Echo Cancellation System" IWSSIP 2010—17th International Conference on Systems, Signals and Image Processing, pp. 1-5.

ITU-T Recommendation G.164, Echo Suppressors, Fascicle III.1, pp. 1-34 (1993).

Copies of NPL documents in parent apn**.

* cited by examiner

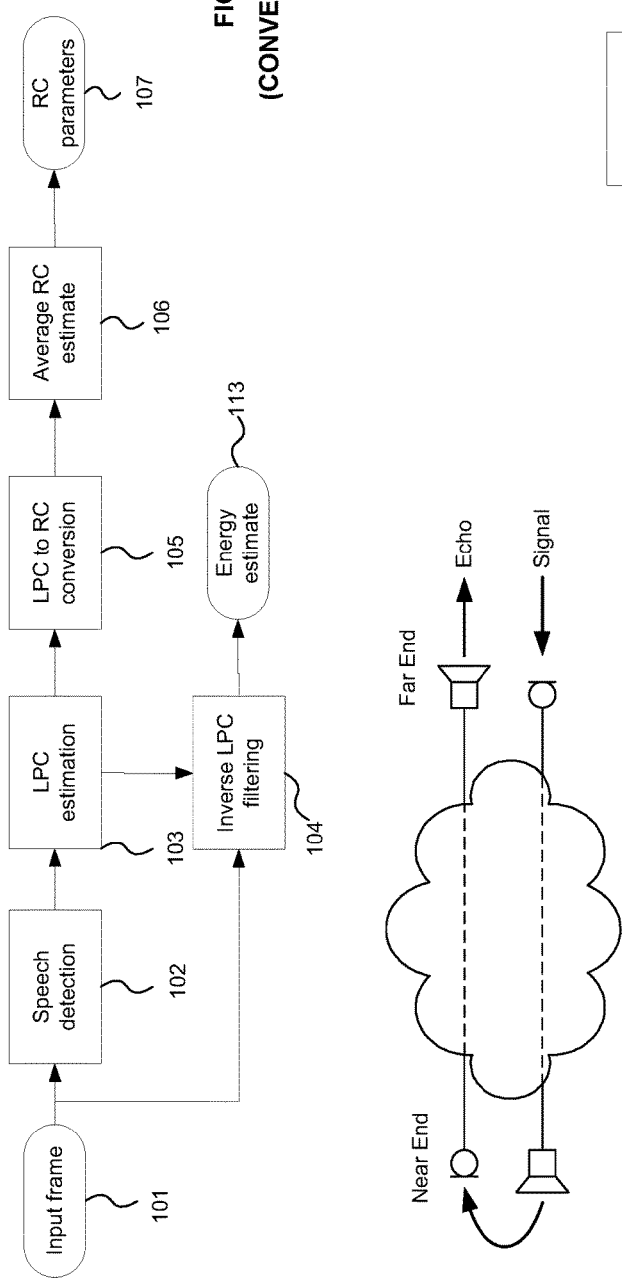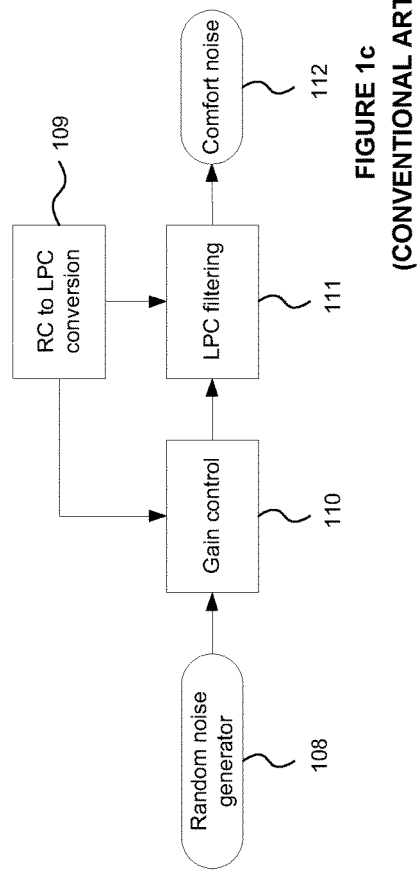

COMFORT NOISE GENERATION

BACKGROUND OF THE INVENTION

This invention relates to a system and method for generating comfort noise.

Various techniques are used in packet-based speech communication systems to maintain a high quality of conversation. In particular, significant effort is made to eliminate or reduce echoes from the speech data transmitted between communication devices. In telephony, audio signals (e.g. including voice signals) are transmitted between a near-end and a far-end. Far-end signals which are received at the near-end may be outputted from a loudspeaker. A microphone at the near-end may be used to capture a near-end signal to be transmitted to the far-end. An "echo" occurs when at least some of the far-end signal outputted at the near-end is included in the near-end signal which is transmitted back to the far-end. In this sense the echo may be considered to be a reflection of the far-end signal. An example scenario is illustrated in FIG. 1a, which shows a signal being captured by a far-end microphone and output by a near-end loudspeaker. The echo is a consequence of acoustic coupling between the loudspeaker and a microphone at the near-end; the near-end microphone captures the signal originating from its own loudspeaker in addition to the voice of the near-end speaker and any near-end background noise. The result is an echo at the far-end loudspeaker.

Echo cancellers are typically employed to eliminate or reduce echoes by synthesizing an estimate of the echo from the far-end voice signal. The estimated echo is then subtracted from the microphone signal. Adaptive signal processing is generally used to generate a signal accurate enough to cancel the echo effectively. Even with high performance adaptive filters it is not always possible for an echo canceller to remove all echoes from a signal, and the echo cancelled signal from an echo canceller will often include a remnant echo of the far-end voice signal. This is because the echo estimate will not always precisely match the true echo in the microphone signal. There can be several reasons for this, including loss of convergence of the adaptive filter due to changes in echo path and as a result of freezing the adaptive filter during near-end speech to avoid wide divergence of the filter.

An echo suppressor can be used to remove the remnant echo when there is no near-end speech by replacing or masking the microphone signal when remnant echo is present. For example, the echo suppressor may replace the remnant echo in the microphone signal with synthetic ambient background noise (or comfort noise) generated at the communication device. This eliminates the remnant echo but provides some low-level noise to the far-end listener, avoiding complete silence which can make a communication channel sound dead.

ITU standard G.711 Appendix II describes a commonly-used technique for generating comfort noise in which linear prediction coding (LPC) is used to generate a noise signal based on a random noise excitation, as shown in FIGS. 1b and 1c. Comfort Noise Generation (CNG) typically comprises two stages: (i) an analysis stage as shown in FIG. 1b in which characteristics of background noise in an input signal are determined (e.g. during noise only periods in which the microphone signal includes neither near-end speech nor far-end speech), and (ii) a synthesis stage as shown in FIG. 1c in which comfort noise is synthesised (e.g. during echo only periods in which far-end speech is present in the microphone signal but near-end speech is not present in the microphone signal). In FIG. 1b, which illustrates the steps performed in a conventional LPC analysis, estimation of LPC coefficients 103 is performed on an input frame 101 when no speech is detected 102 in the microphone signal (e.g. at a Voice Activity Detector, or VAD). In order to estimate the energy in the input signal, the input signal is provided as an excitation signal to an inverse LPC filter 104, which is configured to estimate the energy present in the signal 113 using the LPC coefficients. The LPC coefficients are also converted into reflection coefficients (RC) 105. The RC coefficients can be averaged using a low pass filter 106 so as to yield RC parameters 107 expressing average characteristics of the background noise present in the input signal. The use of RC parameters are less prone to transmission errors and allow a representation of the background noise to be reliably transmitted for use at a remote communication device.

When an echo suppressor at a conventional communication device requires comfort noise to replace the input signal during periods which do not contain near-end speech (e.g. during echo only periods in which far-end speech is present in the microphone signal but near-end speech is not present in the microphone signal), comfort noise synthesis can be invoked as shown in FIG. 1c. A random noise generator 108 provides an excitation signal for an LPC filter 111 configured using LPC coefficients converted at step 109 from the RC parameters 107 derived in the analysis shown in FIG. 1b. The gain 110 of the random noise excitation signal can be controlled using the first reflection coefficient and is used to shape the LPC filter response. The output of the LPC filter provides comfort noise 112.

The conventional approach to generating comfort noise shown in FIGS. 1b and 1c suffers from various problems. The gain adjustment technique can lead to quality issues e.g. if the VAD misdetects periods of no speech, and/or if there are sudden changes in noise level in the microphone signal. In such scenarios, the output power of the synthesised comfort noise can significantly differ from the actual power of the background noise in the input signal. Furthermore, the noise source 108 typically provides white noise which often will not reflect the true ambient noise characteristics in the input signal.

BRIEF SUMMARY OF THE INVENTION

According to a first aspect of the present invention there is provided a system for generating comfort noise for a stream of frames carrying an audio signal, the system comprising:

a frame characterizing logic configured to generate a set of filter parameters characterizing the frequency content of a frame;

an analysis filter adapted using the filter parameters and configured to filter the frame so as to generate residual samples;

an analysis controller configured to cause the residual samples to be stored in a store responsive to receiving an indication that the frame does not comprise speech; and a synthesis controller operable to select stored residual samples from the store and cause a synthesis filter, inverse to the analysis filter and adapted using filter parameters generated by the frame characterizing logic for one or more frames not comprising speech, to filter the selected residual samples so as to generate a frame of comfort noise.

The analysis controller may be configured to cause the residual samples to be stored at the store responsive to receiving at least a predetermined number of said indications in respect of consecutive frames of the stream indicating that those respective frames do not comprise speech.

The analysis controller may be configured to further store residual samples generated for one or more preceding frames of the consecutive frames of the stream in respect of which indications are received.

The frame characteriser may be configured to generate the set of filter parameters using linear predictive coding.

The analysis filter may be an inverse LPC filter and the synthesis filter being an LPC filter.

The frame characteriser may be configured to, responsive to the indication that the frame does not comprise speech, store the set of filter parameters at a parameter buffer and the synthesis controller being configured to select a set of filter parameters from the parameter buffer for use at the synthesis filter.

The synthesis controller may be configured to select the set of filter parameters at random from the parameter buffer.

The analysis controller may be configured to cause the frame characteriser to generate the set of filter parameters for the frame and the analysis filter to filter the frame in response to the indication that the frame does not comprise speech.

The store may comprise an auxiliary buffer and a residue buffer, the analysis controller being configured to cause the residual samples generated at the analysis filter to be stored at the auxiliary buffer and to copy one or more residual samples from the auxiliary buffer to the residue buffer when the auxiliary buffer holds a predefined number of residual samples, the synthesis controller being configured to perform said selection of the stored residual samples from the residue buffer.

The analysis controller may be configured to copy all of the residual samples stored at the auxiliary buffer into the residue buffer when the auxiliary buffer is full and to flush the auxiliary buffer.

The auxiliary buffer may be configured to store residual samples for at least two input frames.

The analysis controller may be configured to flush the auxiliary buffer on receiving an indication that the frame of the stream comprises speech.

The synthesis controller may be configured to select stored residual samples at random from the store sufficient to generate the frame of comfort noise.

The synthesis controller may be configured to make a single selection of stored residual samples sufficient to generate the frame of comfort noise.

The system may further comprise a voice activity detector for identifying speech in the frame and providing said indication to the analysis controller.

The system may be implemented at a communication device having a microphone for capturing near-end speech and a speaker for outputting far-end speech received from another communication device, the audio signal representing an output of the microphone and the voice activity detector being configured to provide said indication to the analysis controller if the frame does not include near-end speech.

The indication that the frame does not comprise speech may be an indication that the frame is a noise frame which does not comprise near-end speech or an echo of far-end speech.

The synthesis controller may be activated independently from the analysis controller in respect of a frame of the stream which is to be replaced with a frame of comfort noise.

The synthesis controller may be configured to, in response to a request for a frame of comfort noise, select stored residual samples and cause the synthesis filter to filter the selected residual samples so as to generate a frame of comfort noise.

The frame characteriser, analysis filter and synthesis filter may be part of one processing path of a plurality of processing paths, wherein each processing path comprises a frame characteriser, an analysis filter and a synthesis filter, and each processing path is arranged to independently generate comfort noise for a respective one of a plurality of frequency sub-bands of the audio signal comprised in the stream of frames, the system further comprising an analysis filter bank arranged to decompose the frame into the plurality of frequency sub-bands and a synthesis filter bank arranged to combine the comfort noise generated for each frequency sub-band into said frame of comfort noise.

According to a second aspect of the present invention there is provided a method for generating comfort noise for a stream of frames carrying an audio signal, the method comprising:
  receiving a frame;
  generating a set of filter parameters characterising the frequency content of the frame;
  adapting an analysis filter using the filter parameters;
  filtering the frame at the analysis filter so as to generate residual samples;
  in response to a determination that the frame does not comprise speech, causing the residual samples to be stored in a store;
  and, in response to a request for comfort noise in respect of the frame:
    selecting stored residual samples from the store;
    adapting a synthesis filter using filter parameters generated for one or more frames not comprising speech; and
    filtering the selected residual samples at the synthesis filter so as to generate a frame of comfort noise.

A non-transitory machine readable storage medium having encoded thereon machine readable code may be provided for generating the system for generating comfort noise. A non-transitory machine readable storage medium having encoded thereon non-transitory machine readable code may be provided for implementing the method for generating comfort noise.

BRIEF DESCRIPTION OF THE DRAWINGS

The present invention will now be described by way of example with reference to the accompanying drawings. In the drawings:

FIG. 1a illustrates near-end and far-end in telephony.

FIG. 1b illustrates a conventional method for estimating noise parameters.

FIG. 1c illustrates a conventional method for generating comfort noise.

DETAILED DESCRIPTION

The following description is presented by way of example to enable any person skilled in the art to make and use the invention. The present invention is not limited to the embodiments described herein and various modifications to the disclosed embodiments will be readily apparent to those skilled in the art.

There is provided a system and method for generating comfort noise. The system or method could be implemented at a communication device configured to enable a user to speak to a remote user of another communication device. For example, the system or method could be implemented at a device having a microphone and speaker and which supports Voice-over-IP (VoIP) so as to enable a user of the device to communicate over a packet-based network with users of compatible VoIP devices. The examples described herein relate to the use of comfort noise to replace a microphone signal in certain circumstances. More generally however, a system or method configured according to the principles described here could be used to generate comfort noise from an input signal for any purpose.

The examples described herein relate to the use of linear predictive coding (LPC) to model noisy regions of an audio signal and generate coefficients for a filter which can replace remnant echo in the audio signal. This is achieved using a residual signal which characterises the underlying noise present in the audio signal. More generally, other speech processing techniques could be used to model an audio signal and form an estimate of the underlying noise present in the audio signal.

Figure 2:
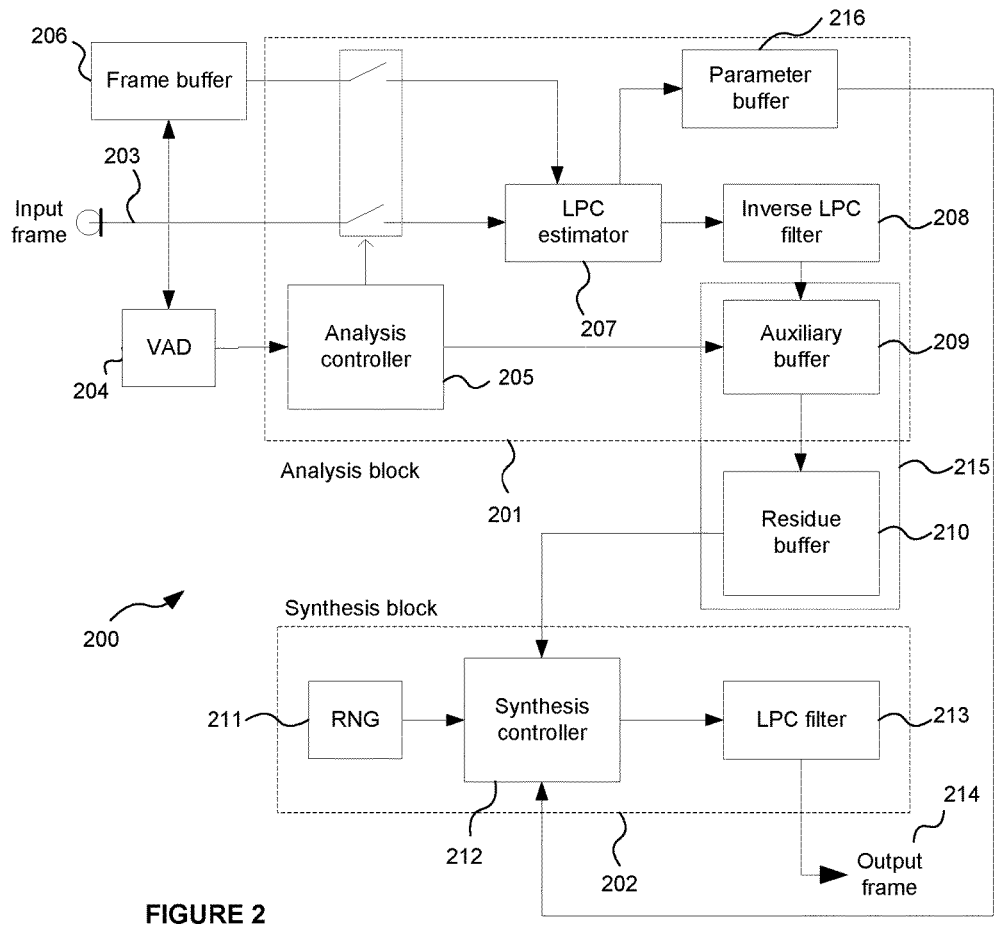
FIG. 2 is a schematic diagram of a system for generating comfort noise.

A system 200 for generating comfort noise is shown in FIG. 2. A microphone captures an audio signal which is sampled and packetized (not shown in the Figure) so as to form a sequence of input frames 203 carrying digital audio data. The system generates a frame of comfort noise 214 in respect of an input frame 203. The microphone is arranged at a communication device to capture speech by a user of the device (i.e. near-end speech). The communication device could further include a speaker for providing speech received over a communication link from a remote communication device (i.e. far-end speech). In this example the communication device might be a VoIP device such as a smartphone, tablet or laptop running suitable software.

As has been discussed with respect to FIG. 1a, acoustic coupling between the speaker and microphone at a communication device can lead to the microphone capturing audio emitted by the speaker and hence the presence of echoes in the captured microphone signal. In the present example in which system 200 is supported at a communication device, an input frame 203 may therefore carry audio data which includes echoes of the audio emitted by a speaker of the communication device. As is well known in the art, an echo canceller can be used on the audio path to substantially eliminate such echoes from the audio signal carried by an input frame. An echo suppressor or non-linear processor can then be used to replace the input signal with comfort noise during periods of remnant echo in the microphone signal. System 200 is adapted to provide such comfort noise which addresses the above-identified problems.

System 200 comprises two processing blocks: analysis block 201 which analyses an input frame 203 so as to form a model for the spectral characteristics of that frame, and synthesis block 202 which uses the model to generate a synthetic noise frame 214. The analysis and synthesis blocks are coupled together by a residue buffer 210 which is configured to store residual signals generated by the analysis block from the input frame and which are used to excite a synthesis filter 213.

In the example shown in FIG. 2, system 200 uses linear predictive coding (LPC) to model the audio signal carried in the input frame. Linear predictive coding is based on the source-filter model of speech production, which assumes that the human voice can be modelled as an excitation signal modified by resonances (or formants) due to the shape of the vocal, nasal and pharyngeal tracts. Voiced speech occurs when glottal pulses are created in the excitation signal by the periodic opening and closing of the vocal folds as air is pushed through the vocal folds by the lungs. Linear predictive coding is a linear model of speech production in which the glottis and vocal tract are assumed to be fully uncoupled. This allows the characteristics of the vocal tract to be modelled separately to the excitation signal.

According to the LPC model, the acoustic characteristics of the vocal tract can be modelled by a filter whose spectral characteristics are chosen to represent those of the vocal tract. By exciting the filter with an excitation signal whose frequency content matches that of the human voice, the basic sounds of human speech can be created. This speech signal can be expressed as the output y[n] of an all-pole filter $1/A(z)$ excited by a signal x[n] as follows:

$$Y(z) = X(z) \frac{1}{A_p(z)} \quad (1)$$

where Y(z) and X(z) are the z-transforms of the speech and excitation signals, respectively, and p is the prediction order. The filter $1/A_p(z)$ is known as a synthesis filter, and $A_p(z)$ is known as the inverse filter which can expressed in component form as:

$$A_p(z) = 1 - \Sigma_{k=1}^{p} a_k z^{-k} \quad (2)$$

where the coefficients $a_k$ are LPC parameters and describe the spectral characteristics of an LPC synthesis filter which can generate a speech signal y[n] from excitation signal x[n].

Taking the inverse z-transform of equation (1), the speech signal can be expressed as:

$$y[n] = x[n] + \Sigma_{k=1}^{p} a_k y[n-k] \quad (3)$$

which demonstrates that a speech sample can be modelled as a weighted sum of the p previous samples plus an excitation signal x[n] which is referred to as the residual.

It follows that an inverse LPC filter can be used to generate the residual signal x[n] from a speech signal y[n] as:

$$x[n] = y[n] - \Sigma_{k=1}^{p} a_k y[n-k] \quad (4)$$

In other words, the residual signal can be estimated as the output of an inverse LPC filter configured with the spectral characteristics described by the LPC parameters $a_k$ and excited by the speech signal y[n]. By estimating the LPC parameters $a_k$ for a speech sample, the LPC model therefore enables the residual signal to be estimated that led to that speech sample. Various techniques are known in the art for estimating the LPC parameters $a_k$, such as autocorrelation analysis or covariance analysis.

As is discussed above in relation to FIG. 1c, an LPC filter can be used to generate comfort noise having the approximate character of the ambient noise present in an input frame which is to be replaced with the comfort noise. Conventionally, comfort noise for an output frame is generated using an LPC filter excited by random white noise and configured using LPC parameters derived from averaged reflection coefficient (RC) parameters for a previous noise frame.

The operation of the system 200 for generating comfort noise shown in FIG. 2 will now be described by way of example. Each received input frame is stored in frame buffer 206. A voice activity detector (VAD) 204 is configured to classify each input frame 203 as containing speech or not. When no speech or echo is present in the input frame the input frame may be considered to represent ambient noise and may be referred to as a noise frame). Any suitable VAD could be used. The VAD provides its determination as to whether each input frame is a noise frame or a frame containing speech to an analysis controller 205. When the analysis controller determines that a predetermined number of consecutive input frames are noise frames, the analysis controller 205 causes the input frame to pass to LPC estimator 207. In FIG. 2, this behaviour is represented by a switch between the input and LPC estimator, but this is merely schematic: the analysis controller could cause the input frame to be analysed at the LPC estimator in any manner. For example, the analysis controller could cause the LPC estimator to read the input frame from a buffer (e.g. buffer 206). In other examples the LPC estimator could analyse received input frames irrespective of the output of the VAD and the VAD could instead control whether the input frame is filtered at inverse LPC filter 208 so as to form a residual for storage at a buffer.

The predetermined number of consecutive input frames could be, for example, 6. In less preferred examples the analysis controller could cause every noise frame to pass to the LPC estimator.

LPC estimator 207 comprises logic configured to analyse the input frame 203 so as to estimate a set of LPC parameters characterising the spectral content of the frame.

The spectral content of the frame may be referred to as the frequency content of the frame. The LPC estimator represents a type of frame characteriser which in other examples could use techniques other than LPC analysis to characterise a received frame. This analysis could be performed in any suitable manner, such as by using covariance analysis or autocorrelation analysis. For example, a frame characteriser could perform autocorrelation analysis using the Levinson-Durbin algorithm and $10^{th}$ order LPC prediction. Since linear predictive coding expresses a signal as a weighted sum of previous samples, it is necessary for the LPC estimator to have access to previously received input frames. These frames are stored in frame buffer 206 which is configured to store at least a predetermined number of consecutive previous frames.

Passing noise frames, but not frames containing near-end speech, to the LPC estimator when a predetermined number of consecutive frames have been received avoids the LPC parameters being estimated from a mixture of noise frames and frames which contain near-end speech. Arranging that the LPC estimator analyses noise frames and not frames containing near-end speech ensures that the LPC parameters are estimated from noise frames only and hence reflect the spectral characteristics of the background noise present in the input signals. The number of consecutive input frames which the analysis controller 205 is configured to receive before it causes the LPC estimator 207 to process an input frame may be determined empirically so as to minimise the influence of speech frames on the generation of LPC parameters whilst ensuring that new estimates of LPC parameters for noise frames are generated at low latency. As an example, the predetermined number of consecutive noise frames may be six.

More generally, the LPC estimator and inverse LPC filter may be configured to operate on each received noise frame, with the analysis controller being configured to store the residual samples generated for a noise frame only once the predetermined number of consecutive noise frames have been received. The analysis controller may be configured to store at the auxiliary buffer residual samples generated for preceding noise frames in the consecutive sequence of noise frames once the predetermined number of consecutive noise frames have been received. The predetermined number of consecutive noise frames could be one.

The LPC parameters estimated by LPC estimator 207 are applied to inverse LPC filter 208 which is configured to receive the audio signal carried in the input frame as its excitation signal. The inverse LPC filter represents a type of analysis filter. In this manner and in accordance with equation (4) above, the inverse filter 208 acts to subtract the estimated spectral characteristics represented by the LPC parameters from the input frame so as to yield a set of residual samples for the frame. The residual samples represent the excitation signal which when used to excite an LPC filter configured with the LPC parameters would generate the input frame. The residual samples, or simply 'residuals', are stored in auxiliary buffer 209.

At least some of the LPC parameters formed at the LPC estimator are used in the manner described below as LPC parameters for LPC filter 213. The LPC parameters may be stored for use at the LPC filter when a frame of comfort noise is next required. For example, each set of LPC parameters formed at the LPC estimator could overwrite the previously cached parameters such that the LPC parameters available for use at the LPC filter are the parameters generated in respect of the last set. In the example shown in FIG. 2, multiple sets of LPC parameters are stored at parameter buffer 216 for subsequent selection by the synthesis controller and use at the LPC filter 213. In alternative examples, an representative set of LPC parameters could be derived from more than one set of LPC parameters and stored for subsequent use at the LPC filter. For example, a running average of LPC parameters could be formed for consecutive noise frames, or a mean of LPC parameters could be formed at the LPC estimator using LPC parameters formed for a predefined number of noise frames. A representative set of LPC parameters could be maintained at parameter buffer 216. In other examples, the LPC parameters could be stored in the auxiliary buffer along with the respective residual samples formed at the LPC inverse filter 208. The LPC parameters could be moved to the residue buffer when the auxiliary buffer is full and are available to be selected by the synthesis controller along with the respective residual samples.

The auxiliary buffer 209 is arranged to hold a predefined number of residual samples. For example, the auxiliary buffer could be configured to hold residual samples corresponding to three input frames—for input frames of length 10 ms, the auxiliary buffer would in this case hold 30 ms of residual data. When the auxiliary buffer is full, the analysis controller copies one or more of the residuals in the auxiliary buffer 209 along with the respective LPC parameters into the residue buffer 210. The analysis controller could, for example, copy all of the residuals in the auxiliary buffer to the residue buffer and clear the auxiliary buffer, or the analysis controller could copy one or more oldest residuals in the auxiliary buffer to the residue buffer so as to free up space in the auxiliary buffer 209 for the next residuals generated by the inverse LPC filter.

In examples described herein the auxiliary buffer 209 and the residue buffer 210 may collectively be considered to be a store 215 in which residuals can be stored, wherein the store 215 comprises the two buffers 209 and 210. In other examples, an auxiliary buffer may not be provided and residuals generated at the inverse LPC filter may be stored directly in the residue buffer according to the principles described herein. That is, in these other examples, the "store" comprises only the residue buffer.

Figure 8:
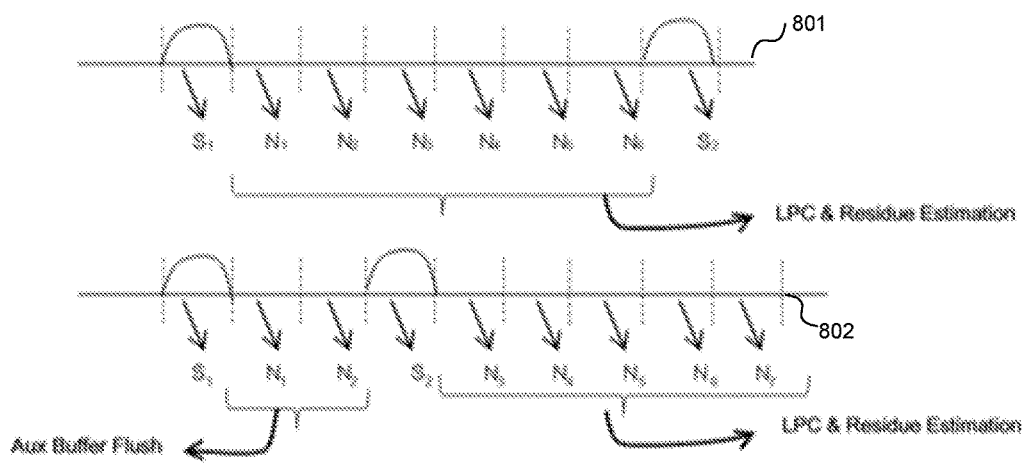
FIG. 8 shows two sequences of microphone frames and the consequent behaviour of the system for generating comfort noise.

If a speech frame is received before sufficient consecutive noise frames are received to fill the auxiliary buffer with residuals, the auxiliary buffer may be flushed to ensure that the residuals copied to the residue buffer relate to a continuous noise segment. This helps to ensure that the residuals which are copied into the residue buffer relate to extended periods of noise which are most likely to capture the true ambient noise present at system 200. This is illustrated in FIG. 8 which shows two sequences of microphone frames.

In the top sequence 801, a speech frame $S_1$ is followed by six noise frames $N_1$ to $N_6$ which represent a noise alone region of the microphone signal. In this example the analysis controller 205 is configured to perform LPC analysis once six consecutive noise frames have been received. Once six consecutive noise frames have been received, the analysis controller causes the LPC estimator 207 to perform LPC analysis in respect of the noise frames. In this example, the LPC estimator begins LPC analysis at the first noise frame, $N_1$, which is held at frame buffer 206. More generally the LPC estimator could begin analysis at any frame of the noise alone region. The resulting residual samples for the analysed frames are stored at auxiliary buffer 209 which becomes full on receiving residual samples for three frames—i.e. noise frames $N_1$ to $N_3$. At this point the residual samples are moved from the auxiliary buffer to the residue buffer. LPC analysis continues for noise frames $N_4$ to $N_6$ at which point the auxiliary buffer is once again full and its contents moved to the residue buffer. A speech frame $S_2$ is then received and the analysis controller suspends LPC analysis until the predetermined number of (in this case 6) consecutive noise frames have been received.

In the bottom sequence 802, a speech frame $S_1$ is followed by two noise frames. The analysis controller is in this example configured to perform LPC analysis once two consecutive noise frames have been received. LPC analysis is performed for noise frames $N_1$ and $N_2$ and the resulting residual samples stored at the auxiliary buffer. However, a speech frame $S_2$ is then received which causes the auxiliary controller to suspend LPC analysis and flush the partially-full auxiliary buffer. Five noise frames $N_3$ to $N_7$ of a noise alone region then follow which are analysed at the LPC estimator once the first two noise frames of the noise along region have been received. The residual samples from the first three noise frames of the region $N_3$ to $N_5$ fill the auxiliary buffer and are moved to the residue buffer, as is indicated in the figure. Noise frames $N_6$ and $N_7$ are analysed at the LPC estimator and the resulting residuals stored at the auxiliary buffer. Whether or not those residual samples make it into the residue buffer depends on whether the next microphone frame is a noise frame (in which case they do) or a speech frame (in which case they don't and the auxiliary buffer is again flushed).

The residue buffer may be larger than the auxiliary buffer but in general may store any number of residuals. If the residue buffer is full, the residuals copied from the auxiliary buffer preferably replace the oldest residuals present in the residue buffer. This could be achieved, for example, if the residue buffer is a circular buffer. Alternatively the residual could be stored at a randomly-selected location in the residue buffer. It is advantageous to flush the residue buffer each time a new connection (e.g. a new call) is established or the parameters of a connection change so as to ensure that the residuals held in the buffer are more likely to closely reflect the noise present in newly-received input frames.

The synthesis of comfort noise from the stored residuals is controlled by synthesis controller 212. System 200 could be provided at any kind of device which requires that a signal is replaced with comfort noise matching the background noise present in that signal. When comfort noise is required—for example, when an echo suppressor or non-linear processor on an audio path of a communication device identifies that a microphone signal comprises a remnant echo but no near-end speech—this is indicated to the synthesis controller. The synthesis controller 212 selects residual samples from the residue buffer 210 and causes those residual samples to be provided as an excitation signal to LPC filter 213. For example, the synthesis controller could cause the residue buffer to provide the selected residuals to the LPC filter, the LPC filter could be configured to obtain the selected residuals from the residue buffer, or, as in the example shown in FIG. 2, the synthesis controller could obtain the selected residuals and pass them to the LPC filter.

The synthesis controller selects a sufficient number of residual samples to generate a frame of comfort noise. The selected residuals could be a set of residuals which were formed in respect of a single noise frame, or could be residual samples formed from more than one noise frame. The synthesis controller could, for example, perform a separate selection for each residual sample, or perform a single selection for a set of residual samples.

The LPC filter is configured using LPC parameters estimated at LPC estimator 207 for noise frames which do not comprise speech or an echo of the far-end signal and so represent a period of noise alone in the microphone signal. In the present example, the LPC parameters used at the LPC filter 213 are selected from parameter buffer 216 by the synthesis controller. This selection may be performed independently from the selection of residuals from the residue buffer. The synthesis controller may be configured to select LPC parameters from the parameter buffer in the same manner in which the synthesis controller is configured to select residuals from the residue buffer. In other examples, the LPC parameters used at the LPC filter may be derived from one or more sets of LPC parameters formed at the LPC estimator for noise frames—e.g. the LPC parameters used at the LPC filter may be a running average or mean of one or more LPC parameter sets.

If multiple sets of LPC parameters are available to select from, the synthesis controller preferably selects a single set of LPC parameters for use in generating a frame of comfort noise at the LPC filter. This avoids introducing artefacts and discontinuities into the generated comfort noise. In less preferred examples, the synthesis controller may select multiple sets of LPC parameters for each comfort noise frame (e.g. a different set for one or more residual samples used to generate the frame of comfort noise).

The use of LPC parameters estimated during periods of noise alone helps ensure that the spectral characteristics applied to the selected residual to generate the comfort noise closely match the spectral characteristics of the ambient background noise of the input signal. The output of the LPC filter 213 is comfort noise representing an output frame 214 to replace input frame 203 on the audio path. In this manner, the system 200 for generating comfort noise can be used to, for example, replace input frames containing a remnant echo after echo cancellation with synthetic noise frames.

The synthesis controller 212 may randomly select one or more residual samples from the residue buffer. Similarly, the synthesis controller may randomly select LPC parameters from parameter buffer 216. Such random selections helps to avoid any bias or phase distortion in the generated comfort noise. The random selection of residuals from the residue buffer may comprise the synthesis controller choosing at random one or more residual samples in the residue buffer, or the synthesis controller selecting from the residue buffer residual samples which have been stored at randomly-chosen locations in the buffer by the analysis controller 205. Similarly, the random selection of LPC parameters from the parameter buffer may comprise the synthesis controller selecting LPC parameters at random or the synthesis controller selecting LPC parameters which have been stored at random in the parameter buffer by the LPC estimator.

The synthesis controller may randomly select one or more residuals from the residue buffer and/or may randomly select LPC parameters from the residue buffer according to the output of a random number generator 211 configured to generate a value in any suitable manner. The value need not be truly random and could be, for example, generated randomly, pseudorandomly, by a normalised Gaussian process, selected from a stored sequence of values having random or pseudorandom character, or selected according to a deterministic but complex predetermined pattern. All of these processes are for present purposes "random" in nature. In examples in which residuals are stored at random locations in the residue buffer by the analysis controller, a random number generator could be used by the analysis controller to randomly select a location in the residue buffer for storing a residual on copying the residual from the auxiliary buffer. In examples in which residuals are stored at random locations in the parameter buffer by the LPC estimator, a random number generator could be used by the LPC estimator to randomly select a location in the residue buffer for storing a residual on copying the residual from the auxiliary buffer.

In the system of FIG. 2, comfort noise is generated using an LPC filter excited by stored residuals of previously received noise frames selected at random from a residue buffer, wherein the LPC filter is configured using LPC parameters selected at random from parameter buffer 216. By using the residuals of input noise frames as the excitation signal for the LPC filter 213 and the LPC parameters estimated for input noise frames (preferably once a predetermined number of consecutive noise frames have been received), a generated noise frame 214 accurately reflects the noise power level and spectral characteristics of the background noise present in the input frame. In other words, the generated noise frame reproduces a close analogue of the background noise present in the input frame without any echo remnants or other acoustic features present in the input frame. Furthermore, the system for generating comfort noise shown in FIG. 2 works well on input frames of smaller sizes and using less complex LPC analysis of a lower order of prediction than is possible with conventional techniques.

The synthesis block 202 of comfort noise generator 200 can be invoked to generate of frame of comfort noise to replace input frames which comprise echo remnants not cancelled by an echo canceller. The comfort noise generated to replace such a frame is however generated using residuals and LPC parameters formed from true noise frames which do not contain any near-end speech or echoes of far-end signals.

The analysis and synthesis controllers shown as functional blocks in FIG. 2 are schematic only and merely group together the logical elements (whether hardware or software) of the system which perform the functions described herein. In fact, the functions performed by the analysis and synthesis controllers could be performed by any hardware or software element of the system, depending on the implementation.

For example, the analysis and synthesis controllers could be implemented as a common controller unit, or the logic represented by the analysis and synthesis controllers could be distributed over the elements of the system (e.g. the LPC estimator could determine when a predetermined number of noise frames have been received and so analyse a received input frame, and/or the auxiliary buffer could have associated logic configured to determine when it is full and so copy its contents into the residue buffer).

The system 200 may be defined in software to operate on input frames received on an audio path of a communication device at which the software is running, with the buffers being defined in a memory of the device. The frame buffer 206 may be a dedicated hardware buffer for receiving input frames on an audio path of the device. In some examples the LPC filter 213 and inverse filter 208 could be provided as hardware filters.

The architecture shown in FIG. 2 can be used for both narrow-band (e.g. a stream sampled at no more than around 8 kHz) and wide-band (e.g. a stream sampled at more than around 16 kHz) streams of input audio frames. The system provides good performance for audio streams having sampling rates of approximately 8 or 16 kHz. For audio streams having higher sampling rates, e.g. above 16 kHz, it can be advantageous to decompose the signal carried in the input frame into frequency sub-bands and independently apply the processing described above with reference to FIG. 2 to each of the sub-bands. This is illustrated in FIG. 3.

Figure 3:
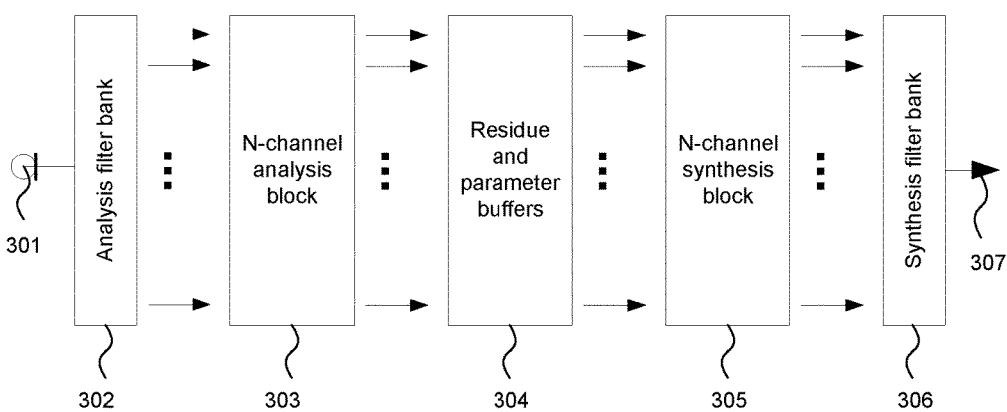
FIG. 3 is a schematic diagram of a system for generating comfort noise using sub-band decomposition.

In FIG. 3, an input frame 301 is decomposed at an analysis filter bank 302 into a predefined set of N frequency bands or channels. The different channels can be processed by different processing paths which each comprise a frame characteriser, an analysis filter and a synthesis filter, wherein each processing path is arranged to independently generate comfort noise for a respective one of a plurality of frequency sub-bands of the audio signal comprised in the stream of frames. In this way, the different channels can be processed separately, thereby determining noise characteristics of different frequency bands so that the synthesised comfort noise can be made to match the characteristics of the ambient noise at the different frequency bands. The number of channels could be configurable at the analysis filter bank such that the number of channels used depends on the sampling frequency of the input frame. For example, varying the number of channels as set out in the table below has been found to yield good quality noise frames for input frames carrying signals sampled at a range of frequencies.

| Sampling rate (Hz) of input frame | Number of channels |
|---|---|
| 8000/16000 | 1 |
| 24000/32000 | 2 |
| 44100/48000 | 3 |
| 96000 | 6 |

The different channels are analysed in parallel at N-channel analysis block 303 which may comprise an analysis block 201 as shown in FIG. 2 for each of the channels. Thus the estimation of LPC parameters would be performed independently for each channel, as would the filtering of each channel at an inverse LPC filter. A frame buffer may be used to hold previous samples generated by the analysis filter bank for each channel so as to enable the estimation of LPC parameters for each channel. There would preferably be a unified analysis controller operating in the manner described above for all of the channels in dependence on (a) the output of a voice activity detector (not shown in FIG. 3) arranged to detect the presence or otherwise of speech in input frame 301, and (b) the fullness of the auxiliary buffer (if present).

Residual samples are generated by the N-channel analysis block 303 for each channel and stored in buffer 304, either via an auxiliary buffer for each channel or directly, as described above in relation to FIG. 2. LPC parameters for each channel are generated by the N-channel analysis block and stored in buffer 304. Buffer 304 is thus configured to hold residuals and LPC parameters for each channel. When synthetic comfort noise is required to replace input frame 301, N-channel synthesis block 305 independently generates comfort noise for each channel. The N-channel synthesis block may comprise a synthesis block 202 for each channel which is configured to select residuals and LPC parameters for that channel and provide the selected residuals to an LPC filter configured using the selected LPC parameters. Synthesis filter bank 306 mixes the comfort noise generated for each channel into a single stream of comfort noise for provision in output frame 307.

Analysis and synthetic filter banks 302 and 306 could operate in any suitable manner. For example, the analysis filter bank could comprise a set of bandpass filters configured to generate the signal for each independent channel and the synthesis filter banks could comprise a set of synthesis filters and adders arranged to mix the individual output channels together to generate comfort noise over the full bandwidth of the audio path.

Figure 4:
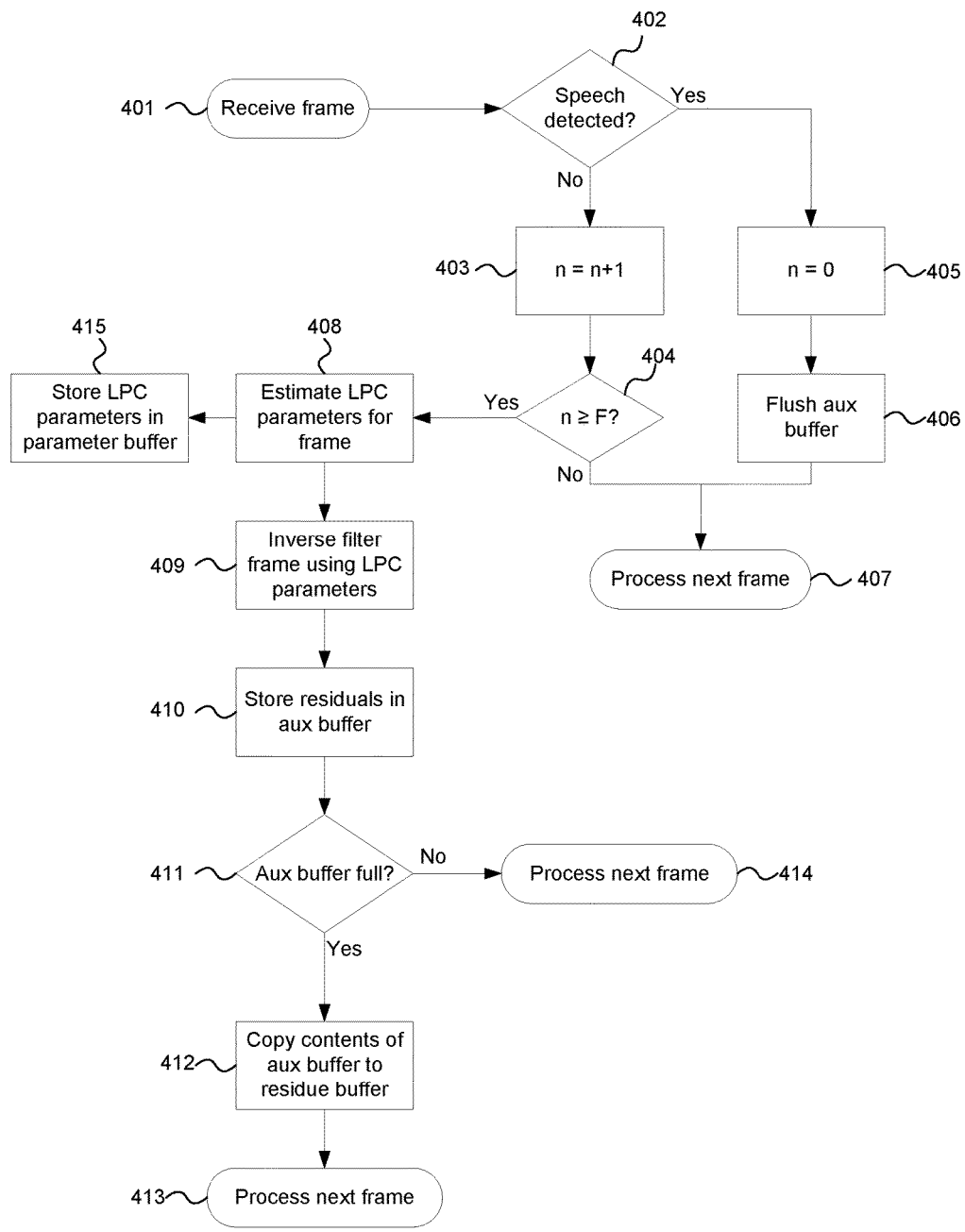
FIG. 4 is a flowchart illustrating the operation of the analysis block of FIG. 2.

FIG. 4 is a flowchart illustrating an example of the operation of the analysis block 201 of the system of FIG. 2. At 401, the system 200 receives an input frame 203 and a voice activity detector 204 determines 402 whether the frame contains speech or not. If no speech is detected and the input frame contains only noise ( ), the analysis controller increments 403 a counter n and checks 404 whether n is greater than or equal to F, i.e. whether or not a predetermined number of noise frames (F) have been received. If check 404 is positive and more than the predetermined number of noise frames (F) have been received, the analysis controller causes the frame to be analysed so as to estimate a set of LPC parameters for the frame 408. The LPC parameters are stored in a parameter buffer 415. If speech is detected at step 402, then the analysis controller sets its counter n to zero 405 and flushes the auxiliary buffer 406. The analysis controller then turns to processing the next received frame 407. Furthermore, if in step 404 it is determined that n is not greater than or equal to F then the analysis controller turns to processing the next received frame at 407.

The LPC parameters formed at 408 are used in an inverse LPC filter operating on the input frame so as to generate residual samples for the frame 409. The residuals are then stored in an auxiliary buffer 410. If a check 411 reveals that the auxiliary buffer is full the contents of the auxiliary buffer are copied to a residue buffer 412 and the analysis block processes the next received input frame 413. If the result of check 411 is negative, the analysis block processes the next received input frame 414.

Figure 5:
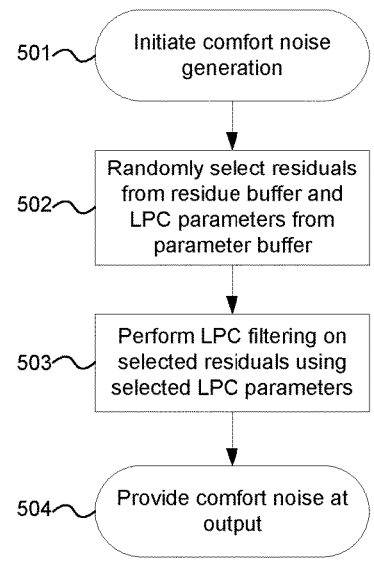
FIG. 5 is a flowchart illustrating the operation of the synthesis block of FIG. 2.

FIG. 5 is a flowchart illustrating the operation of the synthesis block of FIG. 2. Initially, the synthesis controller of the block receives a signal to initiate comfort noise generation in respect of a received input frame 501. The synthesis controller then randomly selects stored residuals and LPC parameters from the residue buffer and parameter buffer, respectively 502. The selected residuals are used as the excitation signal for an LPC filter 503 which is configured using the selected LPC parameters. The output of the LPC filter provides the comfort noise 504.

Figure 6:
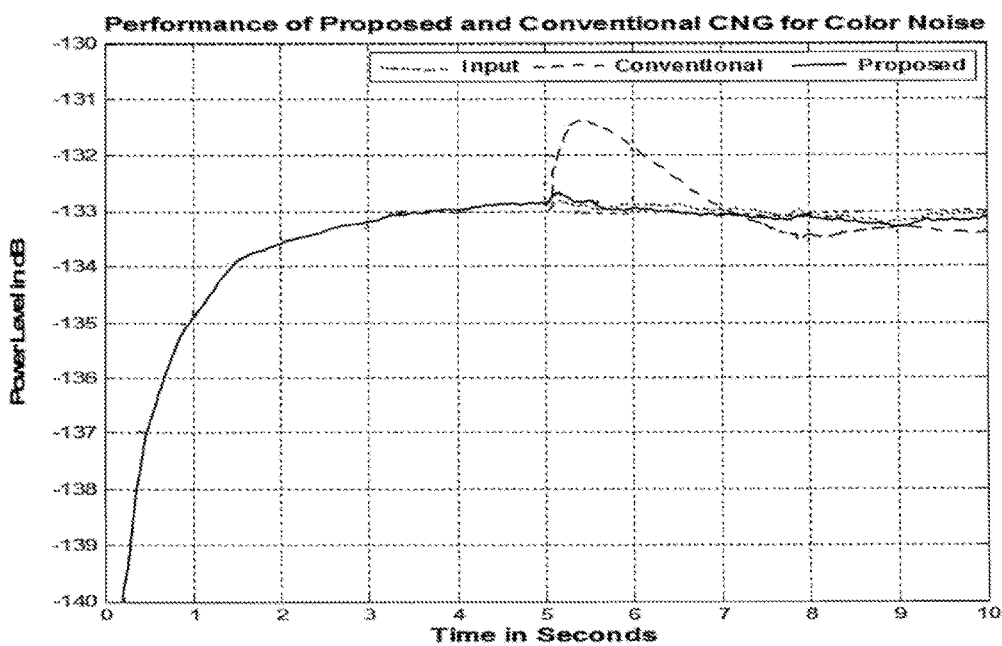
FIG. 6 illustrates the power level tracking of the system of FIG. 2 compared to a conventional G.711 comfort noise generator.
Figure 7:
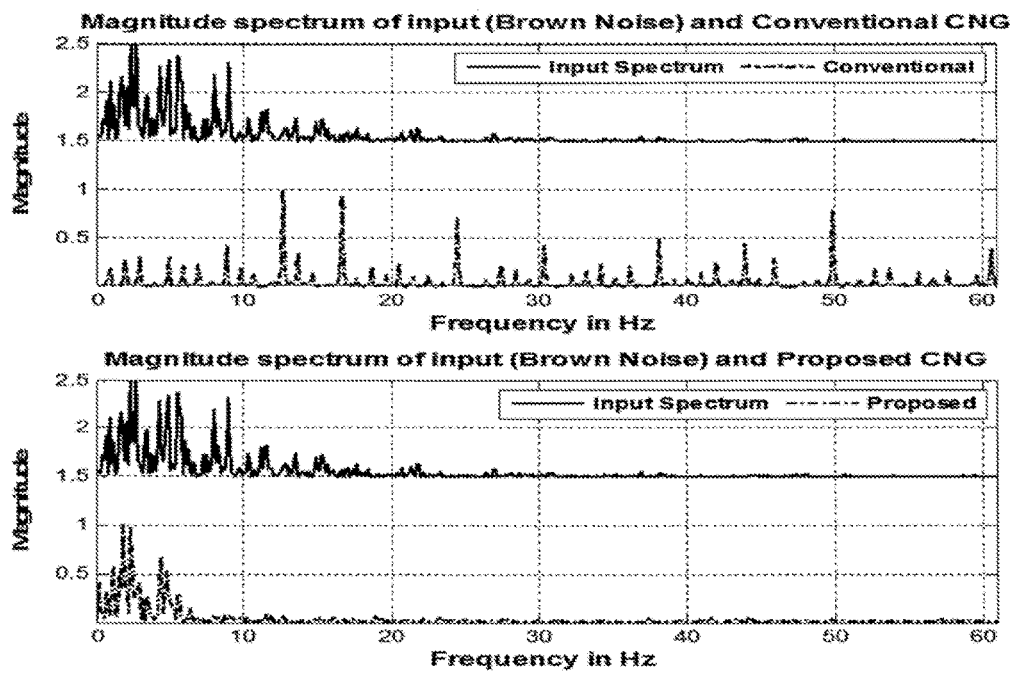
FIG. 7 illustrates the performance of the system of FIG. 2 for wide-band colour noise compared to a conventional G.711 comfort noise generator.

The performance of the system shown in FIG. 2 is compared to that of the widely-used comfort noise generation algorithm defined in ITU G.711 Appendix II in FIGS. 6 and 7 for a wide-band brown noise input signal. FIG. 6 shows the power level tracking capability over time of the proposed system and that of G.711. The proposed system closely tracks the input signal whereas the conventional G.711 algorithm deviates substantially beyond a time of around 5 seconds in the example shown in FIG. 6. The upper plot in FIG. 7 shows the magnitude spectrum of a brown noise input signal and the output of a conventional G.711 comfort noise generator. The lower plot in FIG. 7 shows the magnitude spectrum of the same brown noise input signal and the output of the system described herein. The comfort noise generated using the conventional method deviates substantially from the input brown noise whereas the proposed system closely matches the input noise.

The system for generating comfort noise is shown in FIG. 2 as comprising a number of functional blocks. This is schematic only and is not intended to define a strict division between different logic elements of the system. Each functional block or grouping of functional blocks can be provided in any suitable manner, including as one or more software routines and/or hardware units.

The terms software and program code as used herein includes executable code for processors (e.g. CPUs and/or GPUs), firmware, bytecode, programming language code such as C or OpenCL, and modules for reconfigurable logic devices such as FPGAs. Machine-readable code includes software/program code, as well as code for defining hardware representations of integrated circuits at any level, including at register transfer level (RTL), at high-level circuit representations such as Verilog or VHDL, and lower-level representations such as OASIS and GDSII.

The algorithms and methods described herein could be performed by one or more physical processing units executing software that causes the unit(s) to perform the algorithms/methods. The or each physical processing unit could be any suitable processor, such as a CPU or GPU (or a core thereof), or fixed function or programmable hardware. Machine-readable code could be stored in non-transitory form at a machine readable medium such as an integrated circuit memory, or optical or magnetic storage. A machine readable medium might comprise several memories, such as on-chip memories, computer working memories, and non-volatile storage devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A system for generating comfort noise for a stream of frames carrying an audio signal, the system comprising:
   an analysis block configured to
      generate a set of filter parameters characterising a frame,
      apply the filter parameters to an analysis filter,
      use the analysis filter to filter the frame so as to generate residual samples, and
      responsive to an indication that the frame does not comprise speech, cause the residual samples to be stored in a store; and
   a synthesis block operable to
      select, from the store, stored residual samples which have been generated by the analysis filter, and
      cause a synthesis filter, inverse to the analysis filter and adapted using filter parameters generated at the analysis block for one or more frames not comprising speech, to filter the selected residual samples so as to generate a frame of comfort noise.

2. The system of claim 1, wherein the system is implemented at a communication device.

3. The system of claim 1, wherein the analysis block is configured to cause the residual samples to be stored in the store responsive to receiving at least a predetermined number of said indications in respect of consecutive frames of the stream indicating that those respective frames do not comprise speech.

4. The system of claim 3, wherein the analysis block is configured to further store residual samples generated for one or more preceding frames of the consecutive frames of the stream in respect of which indications are received.

5. The system of claim 1, wherein the analysis block is configured to generate the set of filter parameters using linear predictive coding.

6. The system of claim 1, wherein the analysis filter is an inverse LPC filter and the synthesis filter is an LPC filter.

7. The system of claim 1, wherein the analysis block is configured to, responsive to the indication that the frame does not comprise speech, store the set of filter parameters at a parameter buffer, and wherein the synthesis block is configured to select a set of filter parameters from the parameter buffer for use at the synthesis filter.

8. The system of claim 7, wherein the synthesis block is configured to select the set of filter parameters at random from the parameter buffer.

9. The system of claim 1, wherein the analysis block is configured to generate the set of filter parameters for the frame and use the analysis filter to filter the frame in response to the indication that the frame does not comprise speech.

10. The system of claim 1, wherein the synthesis block is configured to select stored residual samples at random from the store sufficient to generate the frame of comfort noise.

11. The system of claim 1, wherein the system is implemented at a communication device having a microphone for capturing near-end speech and a speaker for outputting far-end speech received from another communication device, the audio signal representing an output of the microphone, and wherein the system further comprises a voice activity detector configured to identify speech in the frame and provide said indication to the analysis block if the frame does not include near-end speech.

12. The system of claim 1, wherein the filter parameters characterise the frequency content of the frame.

13. The system of claim 1, wherein the synthesis block is activated independently from the analysis block in respect of a frame of the stream which is to be replaced with a frame of comfort noise.

14. The system of claim 1, wherein the synthesis block is configured to, in response to a request for a frame of comfort noise, select stored residual samples and cause the synthesis filter to filter the selected residual samples so as to generate a frame of comfort noise.

15. The system of claim 1, wherein the analysis filter and the synthesis filter are part of one processing path of a plurality of processing paths, wherein each processing path comprises an analysis filter and a synthesis filter, and each processing path is arranged to independently generate comfort noise for a respective one of a plurality of frequency sub-bands of the audio signal comprised in the stream of frames, the system further comprising an analysis filter bank arranged to decompose the frame into the plurality of frequency sub-bands and a synthesis filter bank arranged to combine the comfort noise generated for each frequency sub-band into said frame of comfort noise.

16. The system of claim 15, wherein the number of frequency sub-bands in said plurality of frequency sub-bands is varied based on the sampling rate of the frame.

17. A communication device configured to generate comfort noise for a stream of frames carrying an audio signal, the communication device comprising:
   an analysis block configured to
      generate a set of filter parameters characterising a frame,
      apply the filter parameters to an analysis filter,
      use the analysis filter to filter the frame so as to generate residual samples, and
      responsive to an indication that the frame does not comprise speech, cause the residual samples to be stored in a store; and
   a synthesis block operable to:
      select, from the store, stored residual samples which have been generated by the analysis filter, and
      cause a synthesis filter, inverse to the analysis filter and adapted using filter parameters generated at the analysis block for one or more frames not comprising speech, to filter the selected residual samples so as to generate a frame of comfort noise.

18. The communication device of claim 17, further comprising a microphone configured to receive the stream of frames.

19. The communication device of claim 17, wherein the communication device is configured to transmit frames to a far-end communication device, and wherein the frame of comfort noise replaces a frame which does not comprise speech.

20. A non-transitory machine readable storage medium having stored thereon machine readable code that, when executed at a computer system, causes the computer system to perform a method of generating comfort noise for a stream of frames carrying an audio signal, the method comprising:

generating a set of filter parameters characterising a frame;

applying the filter parameters to an analysis filter;

using the analysis filter to filter the frame so as to generate residual samples;

in response to an indication that the frame does not comprise speech, causing the residual samples to be stored in a store, selecting, from the store, stored residual samples which have been generated by the analysis filter;

adapting a synthesis filter using filter parameters generated for one or more frames not comprising speech; and using the synthesis filter to filter the selected residual samples so as to generate a frame of comfort noise.

* * * * *